United States Patent Office 2,790,537
Patented Apr. 30, 1957

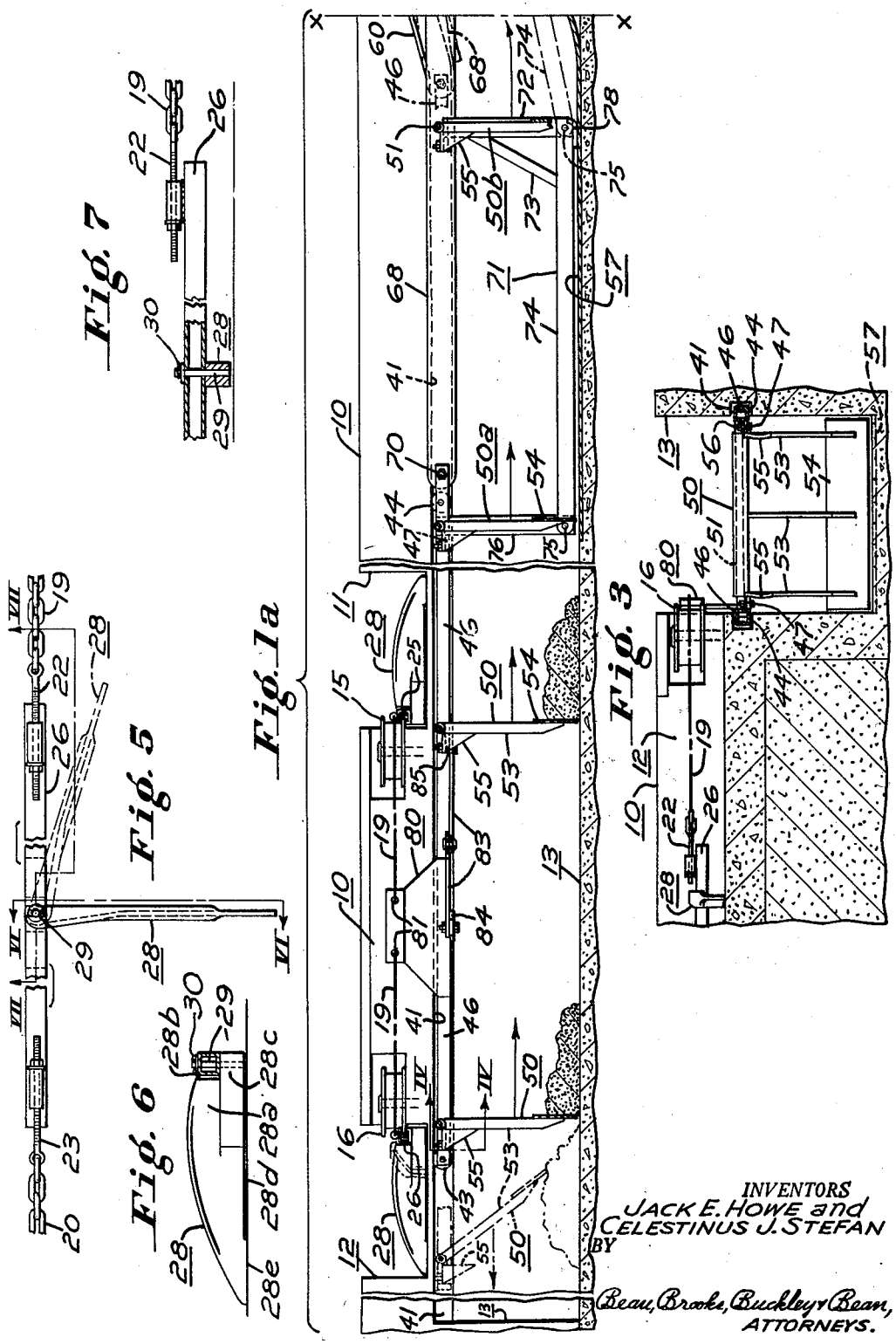

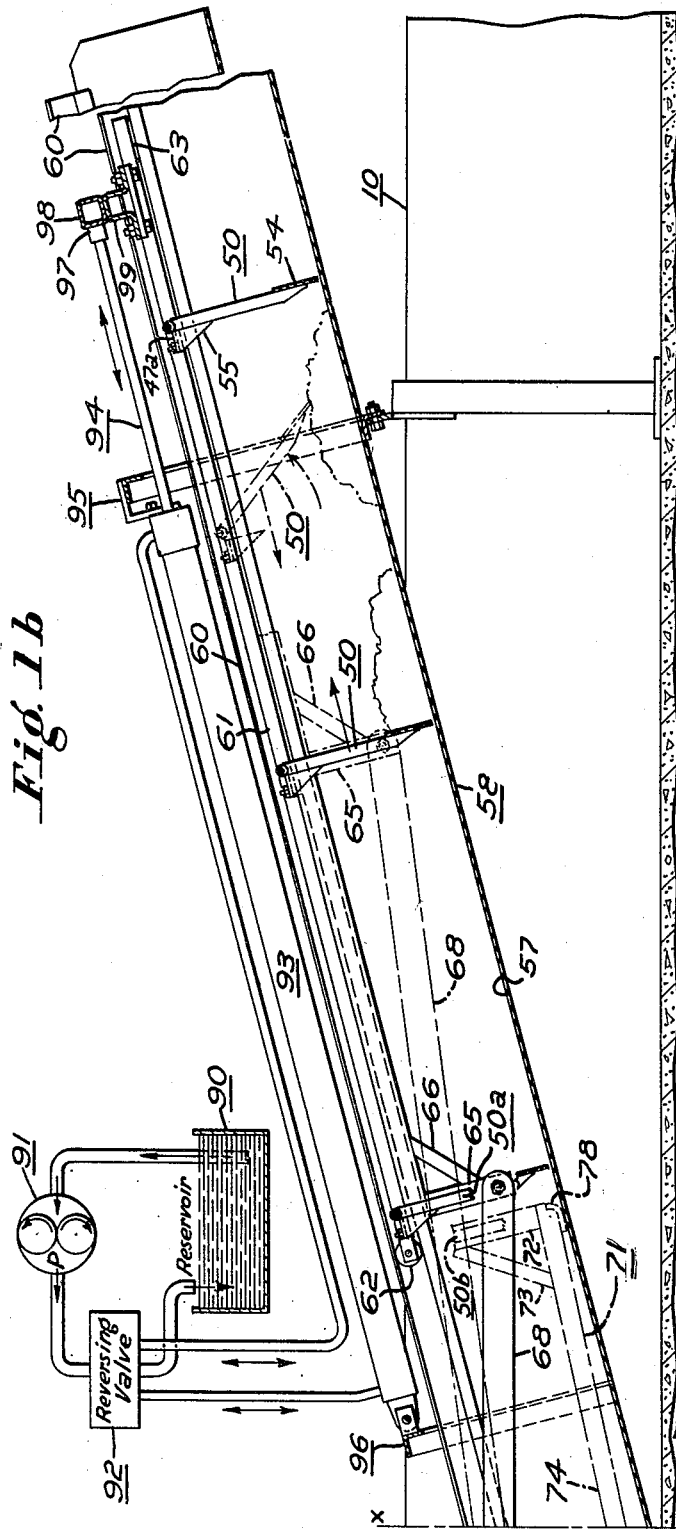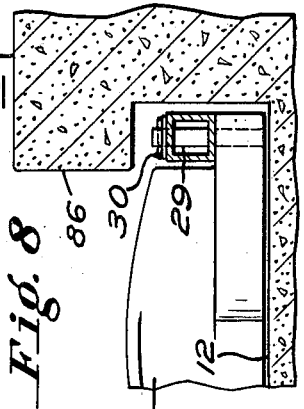

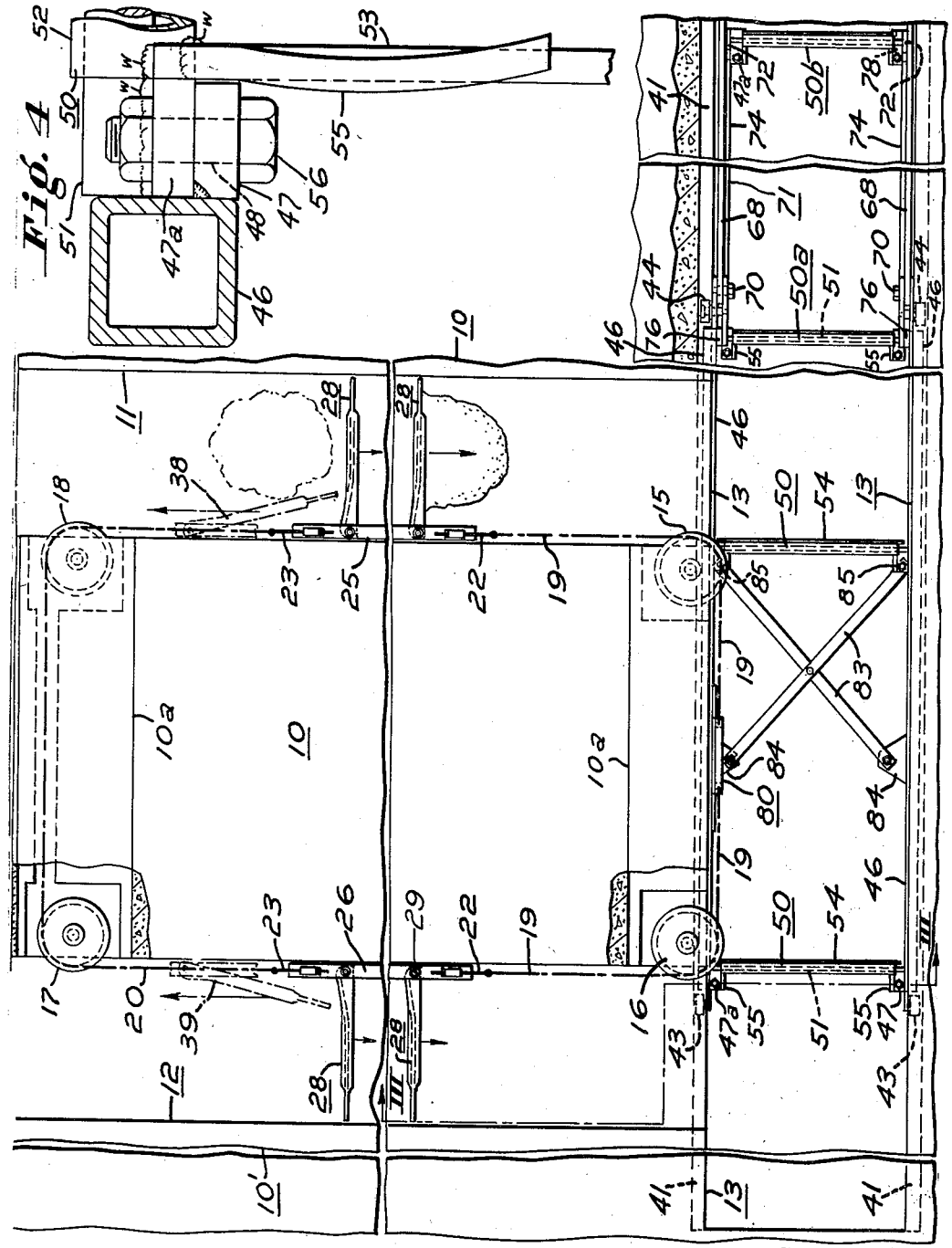

2,790,537

RECIPROCATING BARN CLEANER CONVEYOR

Jack E. Howe, Yorkshire, and Celestinus J. Stefan, Arcade, N. Y.

Application July 14, 1954, Serial No. 443,276

2 Claims. (Cl. 198—79)

This invention relates generally to material conveyor mechanisms and more particularly to an improved conveyor arrangement of the scraper, or paddle type.

A primary object of the invention is to provide an improved conveyor arrangement of the aforesaid type which is simple and inexpensive to install and which is adapted for trouble-free operation under actual operative conditions.

Another object of the invention is to provide a multiple path conveyor system adapted and arranged to be driven by a single power source to convey materials in an improved manner along a plurality of horizontal paths and then upwardly to an elevated discharge point in order that the materials may be discharged under the influence of gravity into a suitable receptacle such as a truck, or the like, for transportation therefrom.

A further object of the invention is to provide improved scraper means so connected and arranged as to be adapted for easy replacement in an ararngement of the aforesaid type.

A still further object of the invention is to provide improved means for elevating materials from a horizontal conveyor portion into an upwardly inclined portion of the conveyor.

A still further object of the invention is to provide an improved conveyor scraper which is adapted to be relatively cheap to make.

And, a still further object of the invention is to provide a conveyor arrangement of the aforesaid type having, in combination, scraper means hinged about a substantially vertical pivot member for operative movements in generally horizontal planes and being operatively connected to cooperate with scraper means hinged about a substantially horizontal pivot member for rotative operative movements away from a vertical scraping position for improved conveyance of materials as aforesaid.

Further objects and advantages will be apparent to those skilled in the art in view of the following description.

In the drawings:

Figs. 1(a) and 1(b) are adapted to be conjoined along line X—X to comprise a fragmentary elevational view, partly in section, of an embodiment of the invention;

Fig. 2 is a fragmentary plan view, partly in section, of the system shown in Figs. 1(a) and 1(b);

Fig. 3 is a generally sectional view taken along the line III—III of Fig. 2;

Fig. 4 is an enlarged fragmentary partly sectional view taken generally along the line IV—IV of Fig. 1(a);

Fig. 5 is an enlarged fragmentary detail plan view of the scraper arrangement indicated in Figs. 1(a) and 2;

Fig. 6 is a partly sectional view taken generally along the line VI—VI of Fig. 5;

Fig. 7 is a fragmentary partly sectional view taken generally along the line VII—VII of Fig. 5;

Fig. 8 is an enlarged fragmentary partly sectional view illustrating a modification of the invention; and, Fig. 9 is a fragmentary elevational view, partly in section, similar to Figs. 1(a) and 1(b), but showing another modification of the invention.

Referring now to the drawing, the embodiment of the invention shown therein includes a barn floor 10 having a pair of gutters 11 and 12 communicating with a deeper crosswise trough 13. A plurality of pulley members 15, 16, 17 and 18 will be provided to be rotatably mounted in suitable recesses of the barn floor structure adjacent the aforesaid gutters and trough. The pairs of pulleys 15—16 and 17—18, respectively, preferably will be covered by horizontally extending plate members 10a—10a set flush with the floor surface 10 (Figs. 1(a), 1(b), 2 and 3).

A plurality of flexible force transmitting members, such as for example the pair of cables or chains 19—20 shown in Figs. 2 and 7, will be trained around the pairs of pulley members 15—16 and 17—18, respectively, so as to be fastened by means of pairs of eye bolts 22—22 and 23—23, respectively, to the ends of a pair of opposed elongate rigid scraper mounting bars 25 and 26. The bars 25 and 26 will be disposed for longitudinal sliding movements along a wall of the gutters 11 and 12, respectively, as in the manner indicated most clearly in Figs. 1(a) and 2 so that alternate reversals of the force transmitting members 19 and 20 about the pulley members 15 to 18 will be translated into reciprocating driving movements of these bars in relatively opposite forward and rearward directions along the walls of their respective gutters.

A plurality of scrapers 28 will be hinged at suitably spaced intervals along the bars 25 and 26, each by means of a pin 29 as shown in Figs. 2, 5 and 6. Thus, the pins 29 will be embedded at one end in the heel end portion of the scrapers 28 and at the opposite end will be journalled through the bars 25 and 26 and retained therein by a suitable washer and cotter pin device 30 (Figs. 6 and 7). It will, of course, be understood that the scrapers mounted on the opposite bars 25 and 26, respectively, will be of relatively opposite hand, e. g., those mounted on bar 25 being of right hand and those mounted on bar 26 being of left hand, and vice versa, if it is desired to accomplish conveyance unidirectionally along the gutters 11 and 12, respectively, in view of the driving arrangement shown. However, it will also be appreciated that the scrapers 28 will all be made of the same hand in the event that it is desired to accomplish conveyance in opposite directions along the gutters 11 and 12, respectively, while using the driving arrangement herein particularly described.

The scrapers 28 will preferably be cast, or otherwise fabricated into a suitable paddle shape including an offset stop portion 28(a) having an inner bar abutment edge portion 28(b), and having a rearwardly extending mounting heel portion 28(c) in which is embedded the upright mounting pin 29. The bottom of scraper 28 will be formed into a scraping edge portion 28(d) substantially laterally related to the axis of the pin 29 and ending in an outwardly offset end pivot portion 28(e) (Fig. 6). It will be understood that the clearance between the bar abutment edge portion 28(b) and the mounting pin 29 will be such as to preclude backward rotative movement of the scrapers 28 from their positions crosswise of the bars 25 and 26 relative to a forward conveying stroke along the gutters. Also, the scraping edge 28(d) will be maintained in slightly raised position over the gutter floor by the end portion 28(e) so that the frictional forces acting on said scraper will be concentrated at a maximum distance from the pivot pin 29 to thereby increase the turning moments acting on the scrapers to provide an improved folding back action of the scrapers 28 after each conveying stroke (Figs. 1(a) and 6).

Thus, it is apparent that alternate reversals of movement of the flexible force transmitting members 19 and 20 about their pulleys 15 through 18 will cause the scrapers 28 to alternately scrape along the gutters and then fold back into an inactive material by-passing position on the return stroke as shown in dotted lines at 38 and 39 in Fig. 2. Also, as noted with more particularity above, it will be appreciated that any materials dropped into the gutters 11 and 12 will be conveyed therealong in a direction dependent upon the position of the offset abutment edge portion 28(b) relative to the mounting pin 29 and the drive bars 25 or 26, as the case might be, i. e., dependent upon whether right or left hand scrapers are used. In the embodiment of the invention illustrated, the system is designed to convey materials unidirectionally along the gutters 11 and 12 so as to be dumped into the crosswise trough 13 wherein it is carried along by the conveyer arrangement hereinafter described.

The opposite side walls of the crosswise trough 13 preferably will be provided with a pair of parallel elongate grooves or guide ways 41—41, being positioned at a level slightly below the bottoms of the gutters 11 and 12 (Figs. 1(a), 2, and 3). Mounted for reciprocating movements longitudinally within the grooves 41—41 by means of pairs of rollers 43—43 and 44—44 fixed to their opposite ends, respectively, are a pair of paddle support and drive bars 46—46. These support bars 46—46 are preferably formed of hollow rectangular metal tubing which is dimensioned so as to fit loosely within the grooves 41—41 and will be provided with a plurality of spaced lugs 47 fixed to extend laterally inwardly into the gutter 13 and being perforated with holes 48 for mounting a plurality of suspension-type paddle units 50 and 50(a) and 50(b).

The paddle units 50 each include a rigid mounting shaft 51 arranged to extend crosswise of the trough 13 just short of the slidebars 46—46 at their ends for rotatably supporting a pipe member 52 having a parallel paddle member 54 rigidly fixed in spaced relation thereto near the gutter floor by means of a plurality of downwardly extending rigid strut portions 53 as shown most clearly in Figs. 1(a), 1(b) and 3. A pair of mounting pads 47(a)—47(a) having pairs of bowed abutment portions 55—55 extending substantially laterally and downwardly therefrom are fixed to the ends of the shaft 51 as by welding, or the like, as shown in Figs. 3 and 4. The forward edge of the abutment portions 55—55 will be arranged to lie in a common plane so as to provide parallel co-planar abutment walls adapted to cooperate with the struts 53 extending from the ends of the member 52 to maintain the paddle portions 54 uprightly crosswise of the troughs 13 during a scraping drive stroke while permitting free arcuate swinging away from the abutments 55—55 upon reversal of the stroke, as more fully discussed hereinafter. The pads 47(a)—47(a) will also be perforated to provide apertures in alignment with the holes 48 in the opposed mounting lugs 47—47 arranged to extend from the slide bars 46—46 as aforesaid. Thus, each of the suspension-type paddle units 50 will be easily individually mountable and demountable on the slide bars 46—46 in the gutter 13 by simply manipulating a suitable bolt 56 arranged to connect the paddle mounting pads 47(a) and the lugs 47 as shown most clearly in Figs. 3 and 4. For this reason, the paddle elements are arranged to be easily accessible for servicing thereof, or the like. The paddle units 50(a) and 50(b) will, of course, be similarly constructed and suspended but with slight dimensional variations in view of the arrangement of the invention for conveying materials upwardly into an inclined gutter portion 57 as set forth below.

Therefore, it is apparent that the scrapers 28 will be hingedly connected at one end for rotation in a generally horizontal manner about the substantially vertical axes of the hinge connections 29 in a single direction from a normal position relative to the slide bars 25 and 26 in the gutters 11 and 12, respectively, while the suspended paddle units 50, 50(a) and 50(b) are arranged to be rotated about the generally horizontal lengthwise axes of the shafts 51 mounted in the gutter 13, being arcuately swingable in a single direction away from an operative scraping position substantially perpendicular to the gutter floor, whereby materials will be adapted to be conveyed along multiple paths horizontally and then upwardly and/or downwardly in an improved manner as more clearly set forth hereinafter.

In order to convey materials and to discharge them from an elevated level, the discharge end of the crosswise gutter 13 is arranged to accommodate a base plate portion 57 formed as part of an angularly upwardly extending trough 58 as shown in Figs. 1(a) and 1(b). A pair of parallel opposed channel guideways 60—60 are shown to be fixed to extend along the upper upwardly inclined edges of the sides of the trough 58 to accommodate a pair of rigid paddle mounting bars 61—61 having a pair of rollers 62—62 at one of their ends, and a pair of slide pads 63—63 at the other ends (Fig. 1(b)) to make these bars freely movable along the guideways under the influence of a suitable reciprocating drive mechanism as described hereinafter.

A plurality of lugs similar to the lugs 47—47 will be fixed in spaced relation along the bars 61—61 whereby a plurality of the paddle units 50 will be mountable thereon in the same manner and for the same purpose as described for the units 50 on the horizontal bars 46—46.

A rigid force bracket comprising a normal force member 65 braced by a diagonal strut 66 will be fixed to extend into the trough 58 from the lower roller mounted end of the paddle mounting bars 61—61 for pivotally mounting one end of a pair of rigid push-pull links 68—68, respectively, along each side of the trough. The opposite ends of these links will be pivotally connected to the roller mounted ends of the bars 46—46 as indicated at the pivotal connections 70—70 shown in Figs. 1(a) and 2. Thus, it will be apparent that the bars 46—46 and 61—61, respectively, will be pivotally interconnected by the links 68—68 so that reciprocating drive means may be connected in the manner hereinafter described to provide for simultaneous actuation of these bars along their respective horizontal and inclined paths.

In order to convey materials forwardly and then upwardly from the horizontally disposed gutter 13 into the inclined trough 58, a follower-type carriage assembly 71 will be pivotally connected to the bars 46—46 for mounting the paddle unit 50(b) in hinged suspended relation thereto and in floating relation for travel along the base 57 of the trough 58.

The carriage 71 will include a pair of spaced support members 72—72 braced by struts 73—73 and being fixedly mounted to extend uprightly from the respective forward ends of a pair of undercarriage support bars 74—74. The back ends of the bars 74—74 will be pivotally connected as indicated at 75—75 to a pair of rigid struts 76—76, respectively, the latter being fixed to depend from the ends of the paddle actuating bars 46—46 by welding thereto, or the like, as shown most clearly in Fig. 1(a). The paddle unit 50(b) will be mounted on a pair of suitable lugs (similar to the lugs 47—47) fixed to extend inwardly from the upper portions of each of the spaced support members 72—72 in a manner similar to that described in connection with the paddle unit 50 and for operation in like manner.

For purposes of guiding the forward end of the paddle carriage assembly 71 upwardly along the inclined trough 58, the respective forward ends of the carriage supports 74—74 will be provided with a pair of shoes 78—78, or the like (Fig. 1(a)). Therefore, it will be apparent that forward movement of the horizontal paddle actuating bars 46—46 will drive the paddle carriage assembly 71, including the paddle unit 50(b) carried thereby, along a forwardly and then upwardly inclined path as its shoes 78—78 guide its forward end up the base portion 57 of the inclined trough 58. As shown in Fig. 1(a) and 2, an upright connecting plate 80 is fixed by welding, or the like, to that slide bar 46 fitted in the inside wall of the gutter 13, with the planar surfaces of the plate 80 being substantially parallel to the inside wall face. The upper portion of the plate 80 will be connected intermediate the ends of the adjacent flexible force transmitting member 19 in the manner shown at 81—81. Thus, both the horizontally swinging conveyors 28 and the suspended scrapers 50, 50(a) and 50(b) will be arranged to be simultaneously operable in predetermined cooperative relationship with each other as aforesaid, so as to be adapted to be actuated from the single hydraulic power source shown by way of example in Fig. 1(b). A pair of diagonally crossed rigid struts 83—83 will be connected by bolting, or the like, to pairs of opposed mounting lugs 84—84 and 85—85, respectively, which will be fixed integrally with their respective slide bars 46—46 so as to extend laterally inwardly therefrom, thus providing a rigid force distributing structural arrangement thereat.

A modified form of the gutters 11 and 12 is illustrated by way of exemplification to comprise cantilevered extensions 86 of the floor 10 to overhang the bars 25 and 26 and portions of the elements connected thereto in the manner indicated in Fig. 8. This arrangement will, of course, serve to give protection to the paddle drive mechanism against damage, as might otherwise be caused by the hooves of cattle, or the like, when the conveyor is used for barn cleaning purposes.

The hydraulic power source mentioned above and shown in Fig. 1(b) comprises generally a fluid reservoir 90, a fluid pump 91, a fluid-reversing valve 92 arranged to alternately apply pressure fluid from the pump 91 to the ends of a piston cylinder 93 for causing a piston member 94 to drive the slide bars 61—61 for reciprocatory movements in their channels 60—60. Thus, it will be appreciated that the piston cylinder 93 will be mounted in parallelism with the inclined trough 58 by means of a pair of support frames 95 and 96 at its opposite ends, respectively, and the piston 94 thereof will be fixed at its outer end as indicated at 97 to a crossbar 98 which is mounted integrally crosswise between the slide bars 61—61 by a pair of brackets 99—99 at each end of the crossbar 98.

A further modification of the embodiment of the invention described herein is illustrated in Fig. 9. In this modified form there will be provided a horizontal gutter portion 102 ending in an inclined trough portion 104. These portions will be arranged in a manner similar to that described above in connection with the gutter 13 and the trough 58, but in this case having pairs of parallel opposed guideways 106—106 and 108—108, respectively, similar to the guideways 41—41 and 60—60 and being arranged to be in conjoined relation to their abutting ends in the manner indicated at 110 to provide a continuous guideway thereat for supporting a floating roller 112 which is adapted to be rolled therealong for supporting one end of a suspension type paddle arrangement 114.

The paddle arrangement 114 will be made similar to the paddle units 50, and the like, for mounting to a roller support bar 115 which rotatably connects to the roller 112 and is provided with a suitable extension inwardly of the gutter and trough for detachably mounting the paddle arrangement 114 in a manner similar to that described above for mounting the paddle units 50 to the lugs 47—47.

It will be appreciated that pairs of slide bars 116—116 and 118—118 will be mounted for sliding movements in the guideways 106—106 and 108—108, respectively, in a manner in accordance with the description set forth above in connection with the slide bars 46—46 and 61—61 and as illustrated in Fig. 9. Thus, the slide bars 116—116 and 118—118 will have their ends mounted on rollers 120 and 122, respectively. Furthermore, the respective ends of the bars 116—116 and 118—118 will be provided with integrally fixed supports 124 and 126 similar to the supports 76 and 65 as above described, and will be arranged to mount, in suspension, scraper arrangements 128 and 130, respectively.

In the modified form shown in Fig. 9, the slide bars 116—116 and 118—118 will be operatively connected by means of opposed pairs of connecting linkages 132—132 and 134—134 at the sides of the respective gutter and trough. The connecting links 132 and 134 at each side will be pivotally interconnected at one of their ends as shown at 136 to a supporting member of the paddle arrangement 114. The opposite ends of the links 132 and 134 will be pivotally connected to the supports 124 and 126 as indicated at 138 and 140, respectively. Therefore, the rigid links 132 and 134 will be arranged to transmit reciprocatory driving forces between the horizontal bars 116—116 and the inclined scrapers mounting bars 118—118.

However, it will be appreciated to be a particular feature of the modified form of the invention shown in Fig. 9, that conveyance of materials will be accomplished in an improved manner from the horizontal gutter 102 into the inclined trough 104 by means of the floating scraper arrangement 114 which by virtue of the floating rotatable roller mounting 112 and its pivotal connection to the links 132 and 134 at 136 will be continually maintained in perpendicular relation to the bottom of the gutter 102 and the trough 104 during a scraping stroke. Thus, the weight of the material being conveyed will act on the bottom of the scraper 114 to cause a reactive force at the upper portion thereof to act against the rotatable roller 112 positioned forwardly of the scraper 114 so that in the vicinity of the scraper position shown in Fig. 9 the upwardly inclined path of the guideways 108 will guide the scraper to rotate about its horizontal mounting shaft to arcuately change its position to maintain it in upright scraping position relative to the base of the trough 104. In the event that the above-mentioned reactive force is not great enough, it will be appreciated that the upper portions of the guideways will accomplish the same effect in view of the fact that turning moments will be applied to the scraper 114 by virtue of the pivotal connection thereto of the links 132 and 134 as at 136. For the latter reason, the framework of the scraper arrangement 114 integrally depending from the mounting bars 115 will be likewise maintained perpendicular to the base of the trough 104 and gutter 102 during the return stroke as the scraper portion of the arrangement 114 passes over the material being conveyed.

It will also be appreciated to be a feature of the invention that the modified form described above can be adapted for use with a single set of connecting links 132 and 134. This may be done by arranging the supports 124 and 126 to accommodate the pivotal connections 138 and 140 between the outer ends of these links and these supports at a position centrally of the gutter 102 and trough 104, respectively, and then likewise arranging the point of pivotal connection 136 between the inner ends of the links 132 and 134 and the scraper 114 so as to be located in alignment with the connections 138 and 140. In this way, a considerable reduction in the number of parts required would be achieved with corresponding savings in material and in time required to assemble the conveyor.

While the preferred forms of my invention have been described in detail herein, it is to be understood that further modifications and changes may be made therein without departing from the spirit of the invention and the scope of the appended claims.

What is claimed is:
1. In a material conveyor system, a pair of parallel gutters containing the material to be conveyed, a slide bar positioned along one wall of each of said gutters, paddles connected to said slide bars and arranged to extend from said bars crosswise of said gutters, said paddles being in hinged connections to said slide bars to permit folding-back movements of the paddles during return strokes of said bars while being held rigidly laterally thereof during driving strokes of said slide bars, a crosswise gutter having a horizontal portion disposed below and crosswise of said parallel gutters and an inclined portion extending therefrom in upwardly inclined attitude, a push-pull bar mounted in said upwardly inclined gutter portion and having scrapers mounted in overhead suspended relation thereon to extend crosswise of said gutter portion, said scrapers being hinged to said push-pull bar to permit by-passing of the material to be conveyed during return strokes of said push-pull bar while being restrained against movements away from crosswise of the gutter during drive strokes of said push-pull bar, a bracket carried by said push-pull bar and extending therefrom and carrying a pivot connection device in line with the approximate vertical center line of said crosswise gutter inclined portion, feed paddles disposed vertically in said crosswise gutter horizontal portion at intervals therealong, a push-pull link system pivotally connected to said pivot connection device and to said feed paddles at positions thereon intermediately of the vertical extents thereof to motivate the latter reciprocatively in said crosswise gutter in response to reciprocation of said push-pull bar, guide rollers carried by the upper ends of said feed paddles and engaging track means along said crosswise gutter to stabilize said feed paddles in attitudes normal to the bottom portions of said crosswise gutter as they move therealong, power supply means operatively connected to said push-pull bar to reciprocate the latter, and a cable and pulley means interconnecting said push-pull bar and said slide bars to cause them all to reciprocate simultaneously.

2. In a material conveyor system, a primary gutter containing the material to be conveyed, a slide bar positioned along one wall of said gutter, paddles connected to said slide bar and arranged to extend from said bar crosswise of said gutter, said paddles being in hinged connections to said slide bar to permit folding-back movements of the paddles during return strokes of said bar while being held rigidly laterally thereof during driving strokes of said slide bar, a crosswise gutter having a horizontal portion disposed below and crosswise of said primary gutter and an inclined portion extending therefrom in upwardly inclined attitude, a push-pull bar mounted in said upwardly inclined gutter portion and having scrapers mounted thereon, a bracket carried by said push-pull bar and extending therefrom and carrying a pivot connection device at the approximate vertical center of said crosswise gutter, feed paddles disposed in said crosswise gutter at intervals therealong, a link system pivotally connected to said pivot connection device and to said feed paddles at positions thereon intermediately of the vertical extends thereof to motivate the latter reciprocatively in said crosswise gutter in response to reciprocation of said push-pull bar, guide means carried by the upper ends of said feed paddles and engaging said crosswise gutter to stabilize said feed paddles in attitudes normal to the bottom portions of said crosswise gutter as they move therealong, power transmission means operatively interconnecting said slide bar and said push-pull bar, and power supply means connected to said transmission means to cause said slide bar and said push-pull bar to reciprocate simultaneously.

References Cited in the file of this patent

UNITED STATES PATENTS

| 416,764 | Towne | Dec. 10, 1889 |
| 1,529,875 | Davis | Mar. 17, 1925 |
| 1,771,778 | Davis | July 29, 1930 |
| 2,522,888 | Nickerson | Sept. 19, 1950 |
| 2,681,132 | Knutson | June 15, 1954 |
| 2,752,029 | Hammond | June 26, 1956 |